Patented July 20, 1937

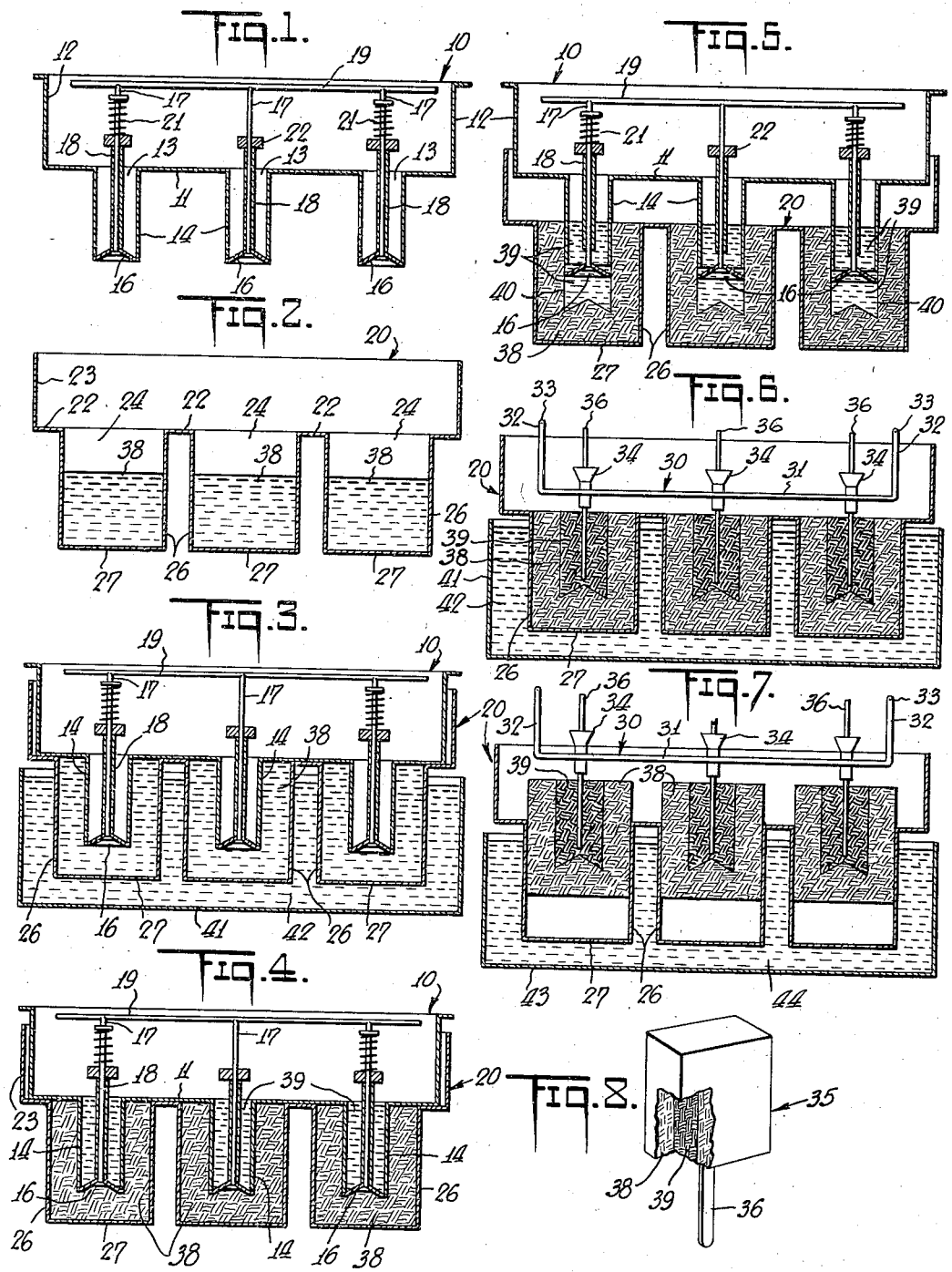

2,087,729

UNITED STATES PATENT OFFICE 2,087,729

METHOD OF MAKING MULTIFLAVORED FROZEN CONFECTIONS

Richard J. Cowling, New York, N. Y., assignor to Joe Lowe Corporation, New York, N. Y., a corporation of Delaware Application September 2, 1936, Serial No. 99,015

5 Claims. (Cl. 107—54)

The present invention relates to a method of forming, refrigerating and harvesting flavored syrup, water-ice, sherbet, ice cream, frozen custard and the like, in individual servings or confections, each of which consists of a combination of different flavors of the same substance or of a combination of different substances, the servings being provided with or without a handle member as desired. The invention has particular relation to a new and improved method of making such individual composite servings or confections in a most efficient, economical and sanitary manner.

Heretofore, confectionery products have been made in the form of individual servings consisting of various combinations of flavors and/or substances, but the disadvantages encountered in their manufacture have prevented their production on a large commercial scale cheaply and efficiently. Generally, such confectionery products have been made entirely by hand molding operations, or by the use of two molds in the following manner: The first and larger mold was partially filled with a substance to be frozen, and the second and smaller mold was positioned therein, the lower ends of the second mold cavities projecting into the syrup in the first mold thereby displacing a portion of it. The combination was then subjected to refrigeration until the substance in the first mold was completely frozen and thereby bonded to both molds. The molds were then removed from the refrigerating medium and the second mold cavities were heated by filling the same with hot water or by other suitable means to melt the bond between them and the frozen substance in the first mold, so that they may be released and withdrawn from said frozen substance to form a cavity in each mold therein. The cavities thus formed in the first substance were thereupon filled with a second liquid or semi-liquid substance of another kind, and the first mold and new contents were again placed in the refrigerating brine tank until the second and new substance was completely frozen.

The foregoing processes of manufacture obviously involve a number of extra steps and handling with resultant disadvantages which may be obviated by practicing the present invention. The method to be hereinafter described permits the manufacture of such novel confectionery products with a fewer number of actual operations, and with a minimum amount of refrigeration, thereby resulting in increased efficiency, economy and sanitation.

An object of the present invention is to provide a new and improved method of manufacturing such confectionery products in a most efficient, economical and sanitary manner, and with a minimum number of operating steps and with a minimum amount of refrigeration.

A further object of the invention is to utilize the cavity-forming second mold as a device for measuring the required amount of material needed to fill the cavity formed in the frozen mass in the first mold.

Another object of the invention is to provide a means of releasing the second or cavity forming mold from the frozen mass in the first mold without requiring a heating of the second mold by the use of a foreign substance which does not enter into the manufacture of the finished confections.

A further object of the invention is the provision of a method of removing the unnecessary latent heat from the second substance to effect a chilling or pre-cooling of the same without requiring the use of additional refrigeration, and further to utilize said latent heat to release the second mold from the frozen substance in the first mold.

Other and further objects and advantages of the invention reside in the detailed description of the method employed and apparatus used, which result in simplicity, economy and efficiency, and which will be apparent from the following description, wherein a preferred form of embodiment of the apparatus utilized in carrying out the invention is diagrammatically shown, reference being had to the accompanying drawing, forming a part hereof, in which:

Fig. 1 is a longitudinal sectional view of the second mold, which is utilized as a filling and cavity-forming device in practicing the invention;

Fig. 2 is a longitudinal sectional view of the first mold, showing the same partially filled with a substance to be frozen;

Fig. 3 is a longitudinal sectional view of the second mold shown in Fig. 1 and the first mold shown in Fig. 2, illustrating the manner in which the two molds are used in forming the cavity in the substance in the first mold, and showing the combined apparatus positioned in a brine tank being subjected to a refrigerating medium;

Fig. 4 is a longitudinal sectional view of the molding apparatus illustrated in Fig. 3, and showing the second substance positioned in the mold cavities of the second mold structure;

Fig. 5 is a longitudinal sectional view of the apparatus shown in Fig. 4, illustrating the manner in which the cavities formed in the first frozen substance are filled with a second unfrozen substance upon removal of the second mold therefrom;

Fig. 6 is a longitudinal sectional view of the first mold with the two substances therein being subjected to refrigeration in a brine tank, and showing a peg structure supporting a plurality of handle members or pegs in the unfrozen second substance;

Fig. 7 is a longitudinal sectional view illustrating the removal of the completed unitary serving from the first mold by means of the peg structure, while the mold is partly submerged in a defrosting tank containing warm water; and Fig. 8 is a perspective view, partly in section, of a finished composite serving made in accordance with the invention, wherein a handle member has been provided to facilitate eating.

Referring now to the drawing, there is shown in Fig. 1 a mold structure 10, having a filling pan 11, upstanding side and end walls 12 and a plurality of spaced openings 13 therein. Mounted in the openings 13 are tubular depending filling tubes or molds 14, which are provided at their extreme lower ends with movable trap-door like bottoms 16. The bottoms 16 of the molds 14 may be operated by any suitable means from inside of the mold structure 10, as shown diagrammatically in Fig. 1, wherein they are connected to the ends of axial supporting rods 17 operating in sleeves 18 which, in turn, are connected to a longitudinally extending bar 19, and are kept in a closed liquid-tight position by spring urging means 21 mounted adjacent the tops of the sleeves 18. The bottoms 16 may be opened by pushing downwardly against the pressure of the springs 21 on the cross-bar 22 fixedly mounted on one of the rods 17, preferably intermediate the ends of the bar 19. Of course, any other suitable means for opening and closing the bottoms 16 of the molds 14 may be employed without departing from the spirit of the invention. It is obvious, however, that the size and shape of the cavity to be formed in the first frozen substance, or the amount of material to be measured by the molds 14, may be varied at will by merely changing the dimensions and shape of the molds 14 of the structure 10.

Referring now to Fig. 2 of the drawing, there is shown the first and larger mold structure 20, which consists of a filling pan 22, upstanding side and end walls 23, and having a plurality of spaced openings 24 therein. Mounted in the openings 24 of the filling pan 22 are depending molds 26, having a closed or fixed bottom 27.

The rack or peg structure 30, shown in Fig. 6, consists of a bar 31 mounted between upright end plates 32 having handles 33 positioned at the extreme upper end to facilitate grasping and manipulating. The peg structure 30 has means, diagrammatically shown at 34, for receiving and releasably locking handle sticks 35 therein.

In the manufacture of the servings 35, the molds 26 of the mold structure 20 are partially filled with a substance 38 to be frozen, which may be any one of the substances hereinbefore named. The substance 38, when it is placed in the molds 26, should be in a liquid or in a soft, flowable, semi-plastic condition, such as ice cream is when it is withdrawn from a conventional ice cream freezer, in order that its viscosity will permit displacement of a portion of the substance when the lower ends of the second mold 14 are immersed therein, thereby causing said displaced substance 38 to rise up and completely fill the cavity of the first mold 26, as best shown in Fig. 3.

The first mold 20 and contents, consisting of the substance 38 and the second mold structure 10, are then placed in a brine tank having circulating refrigerating brine 42 therein, preferably below zero degrees Fahrenheit, and allowed to remain in said brine until the substance 38 is solidly frozen and thereby firmly bonded to the adjoining surfaces of the molds 14 and 26.

The mold cavities 14 of the mold structure 10 are then filled with a second substance 39, which may be any different substance of those heretofore mentioned from the substance 38, or the substance 39 may be the same as the substance 38 but of a contrasting color and different flavor. This second substance 39 is generally in a liquid condition, having a temperature similar to that of the surrounding room, but, of course, it may be ice cream mix as it comes in a semi-frozen condition from a conventional ice cream freezer. The latent heat of the second substance 39, which latent heat may be designated as the degrees of heat F. difference in temperature between it and the melting or freezing point of the frozen substance 38, is found to be sufficient to cause a melting of the crystalline bond formed between the first frozen substance 38 and the outer surface of the mold 14 to permit ready separation and withdrawal of the latter. It has been found that this latent heat is present in sufficient quantities in the second substance 39 even though it is in a semi-frozen condition, such as ice cream as it is withdrawn from a conventional ice cream freezer at a temperature between 25 degrees F. and 28 degrees F. The bonding point of the edible substances generally used in the manufacture of frozen confectionery products of the character described is far below the temperature of semi-frozen ice cream due to the sugar, milk solids, butter fat, etc. present therein in large quantities, and hence there is sufficient heat in such semi-frozen substance to bring about the desired result.

As soon as the bond is melted and broken between the second mold 14 and the first frozen substance 38 by the latent heat extracted from the second substance 39, the second mold structure 10 and molds 14 may be withdrawn, as best shown in Fig. 5, and the bottom doors 16 of the molds 14 may be opened by pressing downwardly on the crossbar 22, thereby permitting the second substance 39 to flow from the molds 14 into the cavities 40 formed in the first frozen substance. At this time a peg structure 30, having a plurality of removable pegs or handle sticks 36, may be positioned over the first mold 20 so that the lower ends of the handles 36 may be immersed and positioned in the unfrozen second substance 39, as best shown in Fig. 6. The first mold 26 and contents are then subjected to further refrigeration in the brine 42 in the tank 41 until the second substance is completely frozen and bonded to the handles or pegs 36 and the inner surface of the molds 26.

Upon removal of the mold structure 20 from the brine tank 41, it may be momentarily immersed in a defrosting tank 43, containing warm water 44, until the bond between the surface of the frozen substance 38 adjacent the inner surface of the mold walls 26 is melted. The confectionery products may then be withdrawn simultaneously from the mold structure 20 by means of their protruding ends of the handle sticks 36 through lifting up on the peg structure 30. The confections are now finished and ready for packaging, storing or sale to the trade.

The sale of these products is seasonal, and very dependent upon climatic conditions which being changeable and quite variable often result in taxing manufacturing conditions to their utmost. It has been found that considerable time and brine tank refrigeration may be saved, resulting in a corresponding increase in production, by pre-cooling or chilling the substance 39 prior to its insertion in the molds. Heretofore, however, this pre-cooling or chilling has been accomplished either by placing the substance 39 in a cooling chamber or placing pieces of ice (not shown) therein, the latter method having the disadvantage of diluting the original substance with the water coming from the melting ice. However, in the present invention it is quite obvious that the second substance 39 is automatically precooled in the molds 26 when the latent heat therein is utilized as a means of defrosting and releasing the second mold 26 from the frozen substance 38 in the first mold, thereby accomplishing the same result in a more facile, economical, efficient and labor-saving manner, and without requiring additional refrigerating means.

Although I have only described in detail one modification which my invention may assume, it will be apparent to those skilled in the art that the invention is not so limited, but that various other modifications may be made therein without departing from the spirit thereof or from the scope of the appended claims.

What I claim is:

1. The method of forming and refrigerating a composite confection of the character described which comprises partially filling a mold with a substance to be frozen, immersing a second mold therein to displace a portion of said substance, subjecting the substance to refrigeration until the latter is congealed, filling the second mold with a substance to be frozen having a temperature above the melting point of the first substance to thereby break the bond formed between the second mold and the first frozen substance, removing the second mold from the first substance and filling the cavity thereby formed with the second substance.

2. The method of forming and refrigerating a multi-flavored confection of the character described which comprises partially filling a mold with a substance to be frozen, positioning a second mold therein so as to displace a portion of said substance and cause it to completely fill the first mold, subjecting the substance to refrigeration until it is congealed and bonded to the molds, filling the second mold with a second substance to be frozen having a temperature above the freezing point of the first substance to thereby break the bond formed between the second mold and the first frozen substance, removing the second mold from the first substance and at the same time filling the cavity thereby formed with the second substance, and subjecting the mold to further refrigeration until the second substance is solidly frozen.

3. The method of forming and refrigerating a composite confection of the character described which comprises partially filling a mold with a substance to be frozen, immersing a second mold therein to displace a portion of said substance, subjecting the substance to refrigeration until the latter is congealed, filling the second mold with a substance to be frozen having a temperature above the melting point of the first frozen substance to thereby melt the bond formed between the second mold and the first frozen substance, removing the second mold from the first frozen substance to form a cavity therein and at the same time filling the cavity in the first frozen substance with the second substance, inserting the lower end of a handle stick into the unfrozen second substance, and subjecting the second substance to refrigeration until it is entirely congealed and bonded to the first frozen substance and the handle stick.

4. The method of simultaneously forming, refrigerating and harvesting a plurality of multi-flavored frozen confections of the character described which comprises partially filling a plurality of mold cavities with a substance to be frozen, inserting a second mold into the substances in the mold cavities to displace a portion of the substances in each cavity, subjecting the substance in the mold cavities to refrigeration until they are solidly frozen and bonded to the molds, filling the second mold cavities with a liquid substance having a higher temperature than the melting point of the first frozen substance to break the bond between the first frozen substance and the second molds to free the latter, removing the freed second molds and releasing the chilled liquid substance therein into the cavity thereby formed in the frozen substance to fill the same, positioning a handle member in the mold cavities and immersing one end thereof in the liquid substance, subjecting the mold cavities to refrigeration until the liquid substance is frozen and bonded to the first frozen substance and the handle members, breaking the bond between the first frozen substance and the mold cavities, and removing the frozen confections simultaneously by means of their handle members.

5. The method of simultaneously forming, refrigerating and harvesting a plurality of multi-flavored frozen confections of the character described which comprises partially filling a plurality of molds with a substance to be frozen, positioning a second mold into each substance to displace a portion thereof and completely fill the first mold, subjecting the substance in the molds to refrigeration until it is solidly frozen and bonded to the molds, filling the second mold with a semi-frozen substance having a temperature higher than the bonding point of the first frozen substance to break the bond between the first frozen substance and the second molds to release the same, removing the second molds and releasing the semi-frozen substance therein into the cavity thereby formed in the first frozen substance to fill the same, positioning a handle member in the semi-frozen substance, subjecting the semi-frozen substance to refrigeration until it is solidly frozen and bonded to the first frozen substance and the handle member, breaking the bond between the first frozen substance and the first molds, and simultaneously removing the frozen confections from the first molds by means of their protruding handle members.

RICHARD J. COWLING.